July 24, 1956  F. MARTINDELL  2,756,372
TELEGRAPH SELECTOR MAGNET DEVICE
Filed Jan. 28, 1953

INVENTOR
FRANK MARTINDELL.
BY Emery Robinson
ATTORNEY

United States Patent Office 2,756,372
Patented July 24, 1956

2,756,372

TELEGRAPH SELECTOR MAGNET DEVICE

Frank Martindell, Chicago, Ill., assignor to Teletype Corporation, Chicago, Ill., a corporation of Delaware Application January 28, 1953, Serial No. 333,795

13 Claims. (Cl. 317—172)

This invention relates to telegraph selector magnet devices and more particularly to a magnet arrangement whereby energization of a pair of magnets in accordance with impulse signals causes the movement of a pair of cores toward each other to control the setting of a telegraph selector mechanism.

In a great number of telegraph receiving apparatuses, the functions to be performed by such apparatus are controlled through the reception of a series of permutative impulses by a single magnet or a number of magnets connected in aiding series. In order to obtain high speed operation, it is necessary that the receiving magnet or magnets instantaneously position mechanical elements in a positive manner, consequently the positioned elements must be of light weight construction, move in accordance with simple kinematic principles, and complete said movement upon the application of a small amount of energy.

It is a principal object of the invention to provide a high speed selector magnet device which functions in an instantaneous and positive manner with a minimum expenditure of energy.

Another object of this invention resides in the utilization of a pair of cores to move a pair of elements to positively position a single control member.

A further object of the invention is the provision of a selector magnet device in which two elements simultaneously apply forces to opposite sides of a member to effectuate a pivoted movement of said member.

An additional feature of the invention resides in a selector magnet device which directly responds to polar telegraph signals to move a pair of elements to control the positionment of a single member.

A further feature of the invention resides in a selector magnet device for operation on a polar signal basis which employs a constant magnetizing means in conjunction with a magnetizing means adapted to fluctuate in response to the reception of polar telegraph signals.

With these and other objects in view the present invention contemplates a pair of solenoids connected in aiding series to a telegraph transmission line. Upon energization of the solenoids by a signal impulse, a pair of resiliently mounted cores are moved toward each other to control the positionment of a control member which in turn controls the setting of a telegraph selector mechanism.

In an alternative embodiment of the invention a permanent magnet is used in conjunction with the solenoids to provide a selector magnet device for operation by polar telegraph signals. When a marking condition (negative current) exists on the transmission line, the solenoids and permanent magnet cooperate to position the control member for controlling the selector mechanism. In the situation where a spacing condition (positive current) occurs on the transmission line, then the magnetic flux set up by the solenoids opposes the effect of the permanent magnet to permit the restoration of the cores to a neutral position and consequently the control member moves to a new position to control the setting of the selector mechanism.

Other objects and advantages of the present invention will be apparent from the following detailed description when considered in conjunction with the accompanying drawing wherein.

Figure 1:
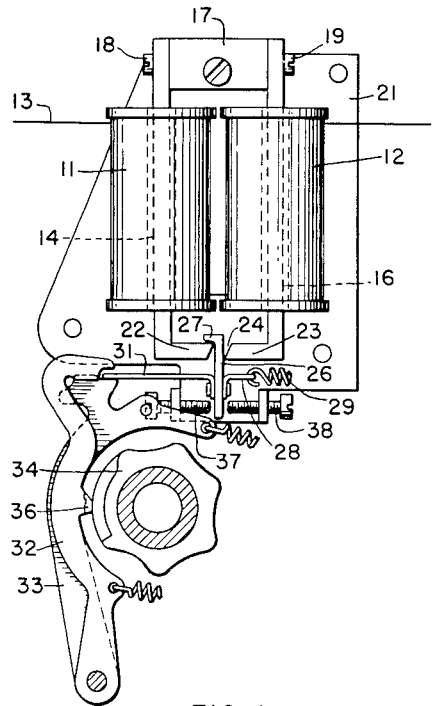
Fig. 1 is a side elevational view of an electromagnetic selector device illustrating one embodiment of the invention in combination with a fragmentary showing of a selector mechanism of a printing telegraph receiver.

Referring to Fig. 1 there is disclosed one embodiment of the invention as applied to a particular type of selector mechanism which is completely described in the patent to W. J. Zenner, No. 2,595,745, issued May 6, 1952. Only so much of the selector mechanism is disclosed as is necessary for a full comprehension of the present invention. It is to be understood that this disclosure of a particular type of selector mechanism is merely for purposes of illustration because the principles of the present invention are not to be construed as limited to use in an identical type of selector mechanism but rather the invention may be advantageously incorporated in many other types of mechanism.

According to the present invention a pair of solenoids 11 and 12 are connected in aiding series to a transmission line 13. Each of the solenoids 11 and 12 has concentrically positioned therein cores 14 and 16 constructed of resilient paramagnetic material and connected at their upper extremities to a spacer 17 by means of screws 18 and 19. The spacer 17 is secured to a bracket 21 which in turn is fastened to any particular selector apparatus in which the invention is to be applied. The lower extremity of the cores 14 and 16 are bent to provide sections 22 and 23 which project towards each other. The sections 22 and 23 are fabricated at an angle at their extremities and are spaced apart to provide a gap 24. The inner circumference of the windings of the solenoids 11 and 12 is selected to provide sufficient area so that the cores 14 and 16 may laterally move within the solenoids.

Positioned within the gap 24 is a pivot element 26 having a lip 27 adapted to overhang the projecting angular portion of the section 22. Secured to one side of the pivot element 26 is a bracket 28 having attached thereto an extended tension spring 29. Tension spring 29 exerts a force on the pivot element 26 to maintain the element 26 in abutting relation to the projecting angular edges of the sections 22 and 23. There is also secured to the pivot element 26 a control member 31 which corresponds in functional action to the armature designated by the reference numeral 12 in the afore-identified patent to Zenner.

As indicated in the Zenner patent the control member 31 cooperates with a pair of sensing levers or sensors 32 and 33 which also provide an interlocking means to lock the control member 31 in marking or spacing position during the respective signal impulses under the control of a pair of control cams 34 and 36. The particular manner in which the sensing levers and control cams cooperate with the control member 31 is described in great detail in the Zenner patent and since this particular mechanism does not form a part of the present invention further description of the manner of operation of these elements is deemed unnecessary.

The present invention is concerned with the movement of the control member 31 and this movement is controlled by the positions assumed by the sections 22 and 23. The extent of the movement of the control member 31 is controlled through the instrumentality of a pair of adjusting screws 37 and 38 which are positioned within the pivotal orbit of the element 26.

For purposes of considering the operation of the invention, assume that a marking or current condition exists in the transmission line 13 which is indicative of an idle condition. A steady current condition exists in the solenoids 14 and 16 to produce a magnetomotive force which forces a magnetic flux through the cores 14 and 16. The path for the magnetic flux consists of cores 14 and 16, the spacer 17, the gap 24 and the pivot element 26 positioned within the gap 24. Inasmuch as all the elements are constructed of paramagnetic material the reluctance of the magnetic path is not great and the effect of the gap 24 is diminished because of the positionment of the paramagnetic element 26 therein. The windings of the solenoids 14 and 16 being connected in aiding series, causes magnetomotive forces to be produced in the sections 22 and 23 which will establish magnetic fields of opposite polarity at the respective ends of the sections 22 and 23. Ends of the sections 22 and 23 are therefore attracted towards each other and since the cores 14 and 16 are constructed of resilient material the sections 22 and 23 move toward each other.

Figure 2:
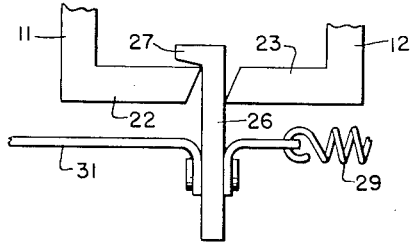
Fig. 2 is an enlarged view showing the actuating means for the selector.

Referring to Fig. 2 it may be seen that movement of the sections 22 and 23 toward each other causes their respective angular tips to exert a force on the pivot element 26. Considering these forces in detail, it may be appreciated that each force is exerted to aid the pivotal movement of the element 26 because the force exerted by the angular tip of the section 22 causes the pivot element 26 to pivot about the tip of the section 23 and the exertion of force by the tip of section 23 causes the pivot element 26 to pivot about the tip of the section 22. The pivot element 26 thereupon pivots in a clockwise direction against the action of the tension spring 29, until the edge of the control member 31 engages the under side of a bent over portion of the sensing lever 32.

Upon the occurrence of a spacing or no current condition in the transmission line 13, the solenoids 11 and 12 are de-energized and hence the magnetic field existing across the gap 24 is removed. The disappearance of the magnetic field permits the cores 14 and 16 to be restored to the position shown in Fig. 1 due to the resilient construction of the core members. Pivotal element 26 is immediately restored to the original position through the agency of the extended tension spring 29. Restoration of the pivot element 26 to its original position moves the control member 31 into engagement with the upper extremity of the sensing lever 33.

Figure 3:
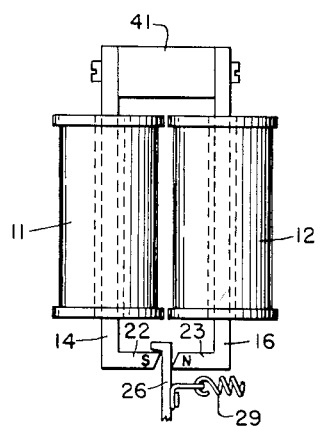
Fig. 3 is a side elevational view of an alternative embodiment of the invention adapted to operate in response to polar telegraph signals.

Attention is now directed to Fig. 3 wherein an alternative embodiment of the invention is disclosed for operation of a polar telegraph system. The embodiment of the invention shown in Fig. 3 is in many ways identical in structure to the embodiment shown in Figs. 1 and 2 and where the elements are the same in the two embodiments, identical numerical designations of the respective elements are used. In this embodiment the solenoids 11 and 12 are again connected in aiding series. Positioned within each of the solenoids 11 and 12 are the two cores 14 and 16 having sections 22 and 23 projecting towards each other. The distinction between the embodiment shown in Fig. 3 and that shown in Fig. 1 resides in the substitution of a permanent magnet 41 for the spacer element 17. It may be therefore appreciated that when the solenoids 11 and 12 are de-energized the permanent magnet 41 will establish a magnetic field between the sections 22 and 23 which will tend to cause said sections to move towards each other.

For purposes of illustrating the operation of the device, assume that there is established by the permanent magnet a south magnetic pole at the extremity of section 22 and a north magnetic pole at the extremity of the section 23. In operation of polar magnetic telegraph systems an idle condition is represented by impressing a marking condition on the transmission line which may be negative battery. The windings in the solenoids 11 and 12 are connected in aiding series and are wound in such a direction that the application of a marking or negative battery condition causes the solenoids to induce magnetic flux within the cores 14 and 16 in such a direction as to establish a south magnetic pole in the extremity of the section 22 and a north magnetic pole at the extremity of the section 23. It may be thus appreciated that the magnetic field established by the permanent magnet 41 and the presence of marking battery on the transmission line causes a flow of current in the solenoids 11 and 12 to establish a second magnetic field which aids the first magnetic field. The combined effect of these two magnetic fields instantaneously moves the sections 22 and 23 towards each other to pivot the pivot element 26.

Upon the existence of a spacing condition on the transmission line which may be positive battery, then the magnetic flux induced in the cores 14 and 16 acts to establish magnetic fields at the extremity of the sections 22 and 23, which are opposite in polarity to the magnetic fields set up by the permanent magnet 41. Inasmuch as the magnetic fields oppose each other, their effect on the pivot element 26 is substantially reduced and as a consequence the spring 29 restores pivot element to the position shown in Fig. 3.

The embodiment of the invention shown in Fig. 3 may be adapted to operate on any polar telegraph system upon proper positioning of magnet 41 and proper selection of the direction of windings for the solenoids 11 and 12. It is to be also noted that the application of two forces tending to rotate the pivot element 26 in a common direction is also attained in the embodiment of the invention shown in Fig. 3.

It is to be understood that the above described arrangement of apparatus and construction of elemental parts are simply illustrative of the principles of the invention and many other modifications may be made without departing from the spirit and scope of the invention.

What is claimed is:

1. An electromagnetic device comprising a pair of solenoids connected in aiding series, a movable core positioned within each of the solenoids, each of said cores having a section projecting towards the other but which the extremities thereof are not in alignment, and an element positioned between the cores to be moved by the movement of the extremities of both cores due to an energization of the solenoids.

2. An electromagnetic device comprising a pair of resilient cores positioned in parallel relationship, each of said cores having a section projecting towards the other but which the extremities thereof are not in alignment, a solenoid positioned about each core, and an element positioned between said cores and adapted to be moved by the cores.

3. In a telegraph selector mechanism, a pair of cores having oppositely beveled extremities projecting toward each other, an element pivotally mounted between said extremities, and means responsive to energizing signals for moving said cores toward each other whereby the leading edges of the beveled extremities act to pivot the element.

4. In a telegraph selector mechanism, a pair of movable cores mounted in parallel relationship, said cores being fabricated at their lower extremities to project toward but not in alignment each other, a solenoid surrounding but spaced from each core, said solenoids being connected in aiding series to produce magnetic fields of opposite polarity at the extremities of the cores whereby said cores are moved toward each other, and an element freely mounted on one extremity and positioned between said extremities of the cores and adapted to be moved by the movement of the cores toward each other.

5. In a telegraph selector device, a pair of solenoids, a pair of resilient cores adapted to move toward each other upon energization of the solenoids, arms formed on the cores to extend toward each other, said arms being spaced apart to provide an air gap between their extremities, and L-shaped element having one leg overlying the extremity of one arm, said other leg positioned within said air gap and so as to be pivoted by the arms when the resilient cores are moved by the solenoids.

6. In an electromagnetic device, a pair of solenoids, a movably mounted core positioned within each solenoid, each of said cores having a section formed to project toward the other, said sections being beveled at their extremities in opposite fashion, and an element positioned between said section whereby energization of said solenoids moves the leading beveled edges toward each other to pivot the element.

7. In a magnetic selector device, a pair of solenoids, a resilient core mounted within each of the solenoids, said cores having beveled extremities which are spaced from each other but whose faces are parallel to each other, an element positioned between said faces, means for urging said element into engagement with the extending edge of both said beveled extremities, and means for energizing said solenoids to move said extending edges of the cores toward each other to pivot the element.

8. A device in accordance with claim 7 having means for limiting the extent of pivotal movement of the element.

9. In a device responsive to electrical impulses, a pair of solenoids connected in aiding series, a resilient core mounted within each solenoid, an arm on each core which projects toward each other, said arms being so formed that their extremities are not in alignment with each other, an element pivotally mounted on the extremities of one of the arms, and means for energizing the solenoids to move the cores toward each other to simultaneously impart pivoting forces to the element.

10. In an electromagnetic device, a pair of movably mounted cores positioned in parallel relationship, said cores being fabricated to provide a pair of sections which project toward each other, said sections being beveled at their extremities to provide extending edges which are in alignment with the receding edges on the opposite sections, an element positioned between said section, an extension on said element adapted to overhang one of the extending beveled edges, and a pair of solenoids connected in aiding series to surround said cores whereby energization of the solenoids moves the cores toward each other to cause the extending beveled edges to pivot the element.

11. In a device responsive to polar telegraph signals, a pair of solenoids connected in aiding series, a core mounted for pivotal movement within each solenoid, and a permanent magnet connected to the cores to apply a magetic field which aids the magnetic field set up by the solenoids being energized by a signal of one polarity and opposes the magnetic field set up by solenoids being energized by a signal of another polarity, each of said cores having a section projecting toward the other but which the extremities thereof are not in alignment, and an L-shaped member having one leg resting on one extremity and the other leg positioned between the extremities.

12. In a device for use in polar telegraph system, a permanent magnet, a pair of resilient cores attached to said permanent magnet, said cores being fabricated to provide sections which project toward each other but are spaced at their extremities, said projecting sections being beveled in opposing fashion, an element positioned between the extremities of the projecting sections, and a solenoid surrounding each of said cores adapted to provide a magnetic field which opposes the field of the permanent magnet upon application of a signal of predetermined polarity, said solenoids adapted to provide a magnetic field which supplements the field of the permanent magnet upon application of a signal of a second predetermined polarity whereby the cores are pivoted toward each other and the extending beveled edges of the projecting sections pivot the element.

13. In a telegraph selector mechanism, a pair of cores having oppositely beveled extremities projecting toward each other, a pivotally mounted element positioned between said extremities, means for urging the element into engagement with the leading edges of the beveled extremities, a permanent magnetizing means for urging said cores together against the effect of the urging means, means responsive to a signal of one polarity for establishing a magnetizing force to aid the permanent magnetizing means to pivot the element, and means responsive to a signal of another polarity for establishing a magnetizing force to oppose the action of the permanent magnetizing means.

References Cited in the file of this patent

UNITED STATES PATENTS

| | | |
|---|---|---|
| 520,365 | Lane et al. | May 22, 1894 |
| 1,800,126 | Williams | Apr. 7, 1931 |
| 2,152,955 | Coyne | Apr. 4, 1939 |
| 2,502,273 | Patry | Mar. 28, 1950 |

FOREIGN PATENTS

| | | |
|---|---|---|
| 58,547 | Holland | Nov. 15, 1946 |